United States Patent
Trester et al.

(10) Patent No.: US 10,755,019 B2
(45) Date of Patent: Aug. 25, 2020

(54) METHOD OF DESIGNING AN INTEGRATED CIRCUIT

(71) Applicant: NXP B.V., Eindhoven (NL)

(72) Inventors: Sven Trester, Goessendorf (DE); Claus Dieter Grzyb, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/264,661

(22) Filed: Jan. 31, 2019

(65) Prior Publication Data

US 2019/0236235 A1  Aug. 1, 2019

(30) Foreign Application Priority Data

Jan. 31, 2018  (EP) .................................. 18154446

(51) Int. Cl.
| | | |
|---|---|---|
| G06F 17/50 | (2006.01) | |
| G06F 30/392 | (2020.01) | |
| H01L 27/02 | (2006.01) | |
| G06F 30/39 | (2020.01) | |
| G06F 30/394 | (2020.01) | |
| G06F 30/398 | (2020.01) | |
| G06F 119/06 | (2020.01) | |

(52) U.S. Cl.
CPC ............ *G06F 30/392* (2020.01); *G06F 30/39* (2020.01); *G06F 30/394* (2020.01); *G06F 30/398* (2020.01); *H01L 27/0207* (2013.01); *G06F 2119/06* (2020.01)

(58) Field of Classification Search
USPC .......................... 716/119, 120, 121, 122, 127
See application file for complete search history.

(56) References Cited

U.S. PATENT DOCUMENTS

| | | | |
|---|---|---|---|
| 5,426,738 A * | 6/1995 | Hsieh ................. | H03K 19/1736 326/38 |
| 6,785,877 B1 | 8/2004 | Kozai | |
| 8,230,378 B2 | 7/2012 | Cohn et al. | |
| 9,721,056 B2 | 8/2017 | Chiu et al. | |
| 2011/0113398 A1 | 5/2011 | Keinert et al. | |
| 2012/0223368 A1* | 9/2012 | Sherlekar .............. | G06F 30/392 257/203 |
| 2012/0286858 A1* | 11/2012 | Biggs ................ | H01L 27/11807 327/565 |
| 2014/0201695 A1* | 7/2014 | Sigal ..................... | G06F 30/394 716/120 |
| 2019/0155984 A1* | 5/2019 | Chen ................... | H01L 27/0207 |

OTHER PUBLICATIONS

Extended European Search Report for Patent Appln. No. 18154446.1 (dated Jun. 11, 2018).

* cited by examiner

*Primary Examiner* — Brian Ngo (57) ABSTRACT

In accordance with a first aspect of the present disclosure, a method of designing an integrated circuit is conceived, comprising: placing integrated circuit cells that include supply pins in a plurality of predefined rows; determining blocked areas for supply pin extensions; extending the supply pins outside said blocked areas. A corresponding integrated circuit is also provided.

13 Claims, 6 Drawing Sheets

METHOD OF DESIGNING AN INTEGRATED CIRCUIT

CROSS-REFERENCE TO RELATED APPLICATIONS

This application claims the priority under 35 U.S.C. § 119 of European patent application no. 18154446.1, filed on Jan. 31, 2018, the contents of which are incorporated by reference herein.

OVERVIEW

The present disclosure relates to a method of designing an integrated circuit. Furthermore, the present disclosure relates to a corresponding integrated circuit. Integrated circuits (ICs) comprise supply pins which often form part of a so-called supply grid. The resistance of such a supply grid should not be too high, because this may result in signal integrity issues. Furthermore, it is desirable that the overall IC area is as small as possible. This implies that the amount of routing resources used for supply routing should also be as small as possible.

SUMMARY

In accordance with a first aspect of the present disclosure, a method of designing an integrated circuit is conceived, comprising: placing integrated circuit cells that include supply pins in a plurality of predefined rows; determining blocked areas for supply pin extensions; extending the supply pins outside said blocked areas.

In an embodiment, said blocked areas include areas in which, according to a requirement for a minimum distance between the supply pins and one or more metal structures of the integrated circuit cells, the supply pins cannot be extended.

In an embodiment, said blocked areas include areas in which, according to a requirement for a minimum distance between the supply pins and one or more metal structures external to the integrated circuit cells, the supply pins cannot be extended.

In an embodiment, wherein said blocked areas include areas in which, according to design rule constraints, the supply pins cannot be extended.

In an embodiment, placing the integrated cells including the supply pins in the plurality of predefined rows is performed using a standard place and route flow.

In an embodiment, the steps of determining the blocked areas for supply pin extensions and extending the supply pins outside said blocked areas are performed after the standard place and route flow.

In an embodiment, the steps of determining the blocked areas for supply pin extensions and extending the supply pins outside said blocked areas are performed before the routing step of the standard place and route flow.

In an embodiment, the method further comprises verifying the integrated circuit design after extending the supply pins.

In an embodiment, the integrated circuit cells include one or more additional supply pins, and the method further comprises determining blocked areas for extensions of the additional supply pins, and extending the additional supply pins outside said blocked areas.

In an embodiment, two or more of said supply pins are connected to each other to form a follow pin row.

In an embodiment, the supply pins include vss and vdd supply pins.

In an embodiment, said integrated circuit cells comprise different instances of standard cell types.

In an embodiment, extending the supply pins outside said blocked areas comprises extending the supply pins up to a user-defined limit.

In an embodiment, a method of fabricating an integrated circuit comprises a design method of the kind set forth.

In accordance with a second aspect of the present disclosure, an integrated circuit is provided, which has been fabricated using a fabrication method of the kind set forth.

DESCRIPTION OF DRAWINGS

Embodiments will be described in more detail with reference to the appended drawings, in which.

DESCRIPTION OF EMBODIMENTS

As mentioned above, integrated circuits (ICs) comprise supply pins which often form part of a supply grid. The resistance of such a supply grid should not be too high, because this may result in signal integrity issues. Furthermore, it is desirable that the overall IC area is as small as possible. This implies that the amount of routing resources used for supply routing should also be as small as possible. More specifically, in today's semiconductor industry, especially in very-large-scale integration (VLSI) ICs, the avoidance of signal integrity issues such as voltage drops is an important part of the physical design work. A lot of IC resources are used for supply distribution as the power consumption and the current density of ICs is increasing. For semi-custom ICs normally a higher metal layer grid is created which is finally connected to the supply pins of standard cells. As mentioned, it is desirable to reduce the overall supply grid resistance. This, in turn, may reduce signal integrity issues or can be used to free up higher layer resources for signal routing, which allows a higher utilization of standard cells and hence a smaller IC area.

Therefore, in accordance with the present disclosure, a method of designing an integrated circuit comprises: placing integrated circuit cells that include supply pins in a plurality of predefined rows; determining blocked areas for supply pin extensions; extending the supply pins outside said blocked areas. By adaptively extending the supply pins of the integrated circuit cells, the overall supply grid resistance is reduced. This, in turn, may reduce signal integrity issues or can be used to free up higher layer resources for signal routing, which allows a higher utilization of standard cells and hence a smaller IC area.

Figure 1:
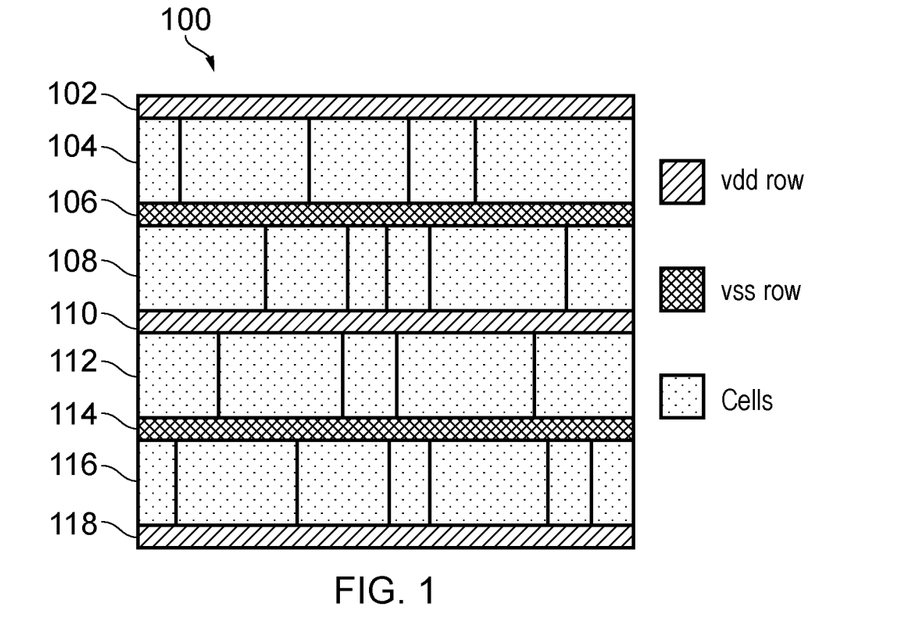
FIG. 1 shows a top view of an integrated circuit.

FIG. 1 shows a top view of an integrated circuit 100. More specifically, a cut out of a semi-custom block is shown. The integrated circuit 100 comprises a first row 104 of cells, a second row 108 of cells, a third row 112 of cells, and a fourth row 116 of cells. Furthermore, the integrated circuit contains vdd follow pin rows 102, 110, 118 and vss follow pin rows 106, 114, which have been formed by the cell placement. ICs designed in a semi-custom approach make use of standard cells to implement the intended functions. These standard cells are provided in internal or external libraries targeting different use cases, like low power, low leakage or high speed. The standard cells normally have supply pins which are designed based on the use case requirements. The supply pin width is defined by the standard cell width, and the height is defined by the library and is predefined for all cells, such that the cells can be placed in predefined rows, in any constellation of cells without introducing any design rule constraint (DRC) problems. The standard cell supply pins connect to the supply pins of the neighboring cells via abutment; the resulting construct is often referred to as follow pin row. The semi-custom blocks are normally designed following a common flow, which is often referred to as a standard place and route flow. This flow may include steps like placement, clock tree synthesis (CTS) insertion and routing mixed with several optimization steps or any required additional steps. CTS is often performed after placement and first optimization; it adds driving cells to the clock net to ensure the needed clock net slew times, a certain skew for the elements connected to the clock net and a design specific insertion delay for the clock net. For Design for Manufacturing (DfM) purposes also measures like wire spreading and wire widening may be applied. These measures aim at increasing the manufacturability of the IC.

FIG. 1 shows a simplified view of the predefined rows 104, 108, 112, 116 where standard cells are placed. Due to the abutment of the cell placement their supply pins are connected to each other and form a continuous row of supply 102, 106, 110, 114, 118, which is often referred to as a follow pin row. Any gaps in the cell placement are filled with cells which contain a small capacitance or are functionally useless and should only ensure an unbroken row. Follow pin rows are an important part of the overall supply grid implementation for standard cell designs and might, depending on the overall supply grid strategy even use the better part of metal layer resources of the complete supply structures. Two supply rows are normally needed to feed one row of standard cells. The different needed supply types are often referred to as "vdd" and "vss" or comparable nomenclatures. For area reasons, often every other cell row is placed in a mirrored fashion such that two rows of cells always have a vdd and a vss row. In certain cases, also additional supplies are needed for the cells, e.g. for level shifting and state retention concepts. In these cases, the cells might have additional supply pins in the middle of the cell area which can form additional supply rows. For the sake of conciseness, these cases are not explained in detail, but they may in general also be covered by the presently disclosed method.

Figure 2:
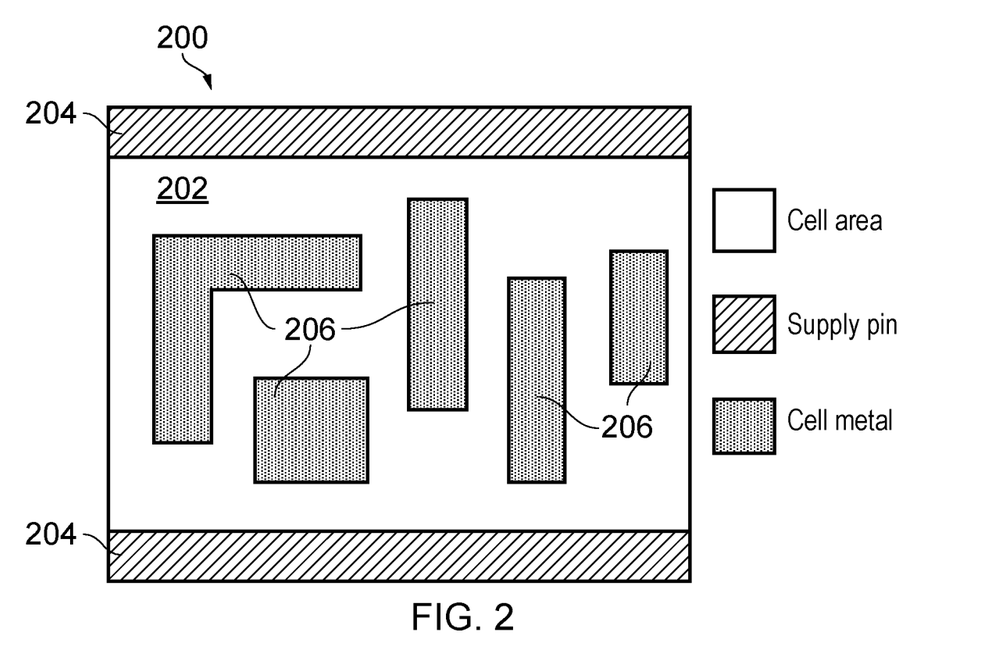
FIG. 2 shows a top view of a standard cell.

FIG. 2 shows a top view of a standard cell 200. The cell 200 comprises a cell area 202. Supply pins 204 have been placed adjacent to or overlapping with the cell area 202. Furthermore, the cell 200 comprises cell metal 206. The cell metal 206 comprises supply-unrelated metal structures, like signal pins or cell-internal connections. The supply pins 204 are often built using one metal layer, but also concepts using overlapping layers as supply pins are possible. The latter are in general covered by the presently disclosed method, but are not explained in more detail. The supply-unrelated cell-internal metal 206 may also consist of one or more metal layers.

Figure 3:
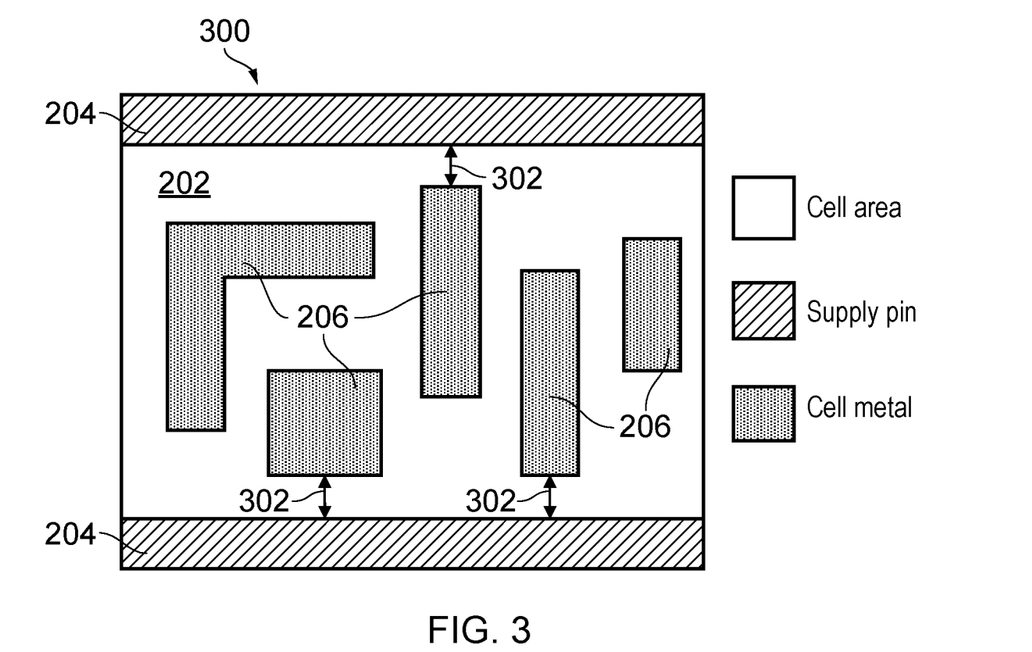
FIG. 3 shows another top view of a standard cell.

FIG. 3 shows another top view of a standard cell 300. In FIG. 3, areas having already the minimum required distance 302 between the supply pins 204 and the supply-unrelated metal structures 206 are shown. These areas normally define the dimensions of the standard cell supply pins for a complete library.

Figure 4:
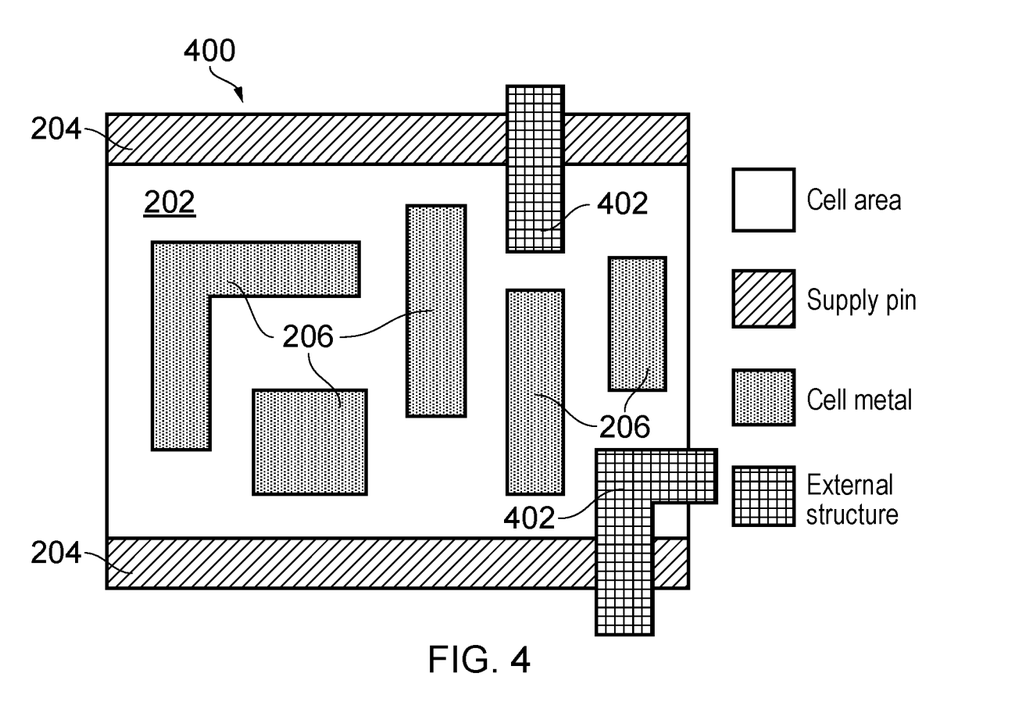
FIG. 4 shows a further top view of a standard cell.

FIG. 4 shows a further top view of a standard cell 400. During the execution of the standard place and route flow additional structures may be added. This is an approach which makes use of the existing resources to achieve optimal results. A simplified outcome with added external structures 402 is shown in FIG. 4. The added structures 402 may be metal or via connections in the same layer as the supply pins 204 and cell-internal structures 206, or in neighboring layers.

Figure 5:
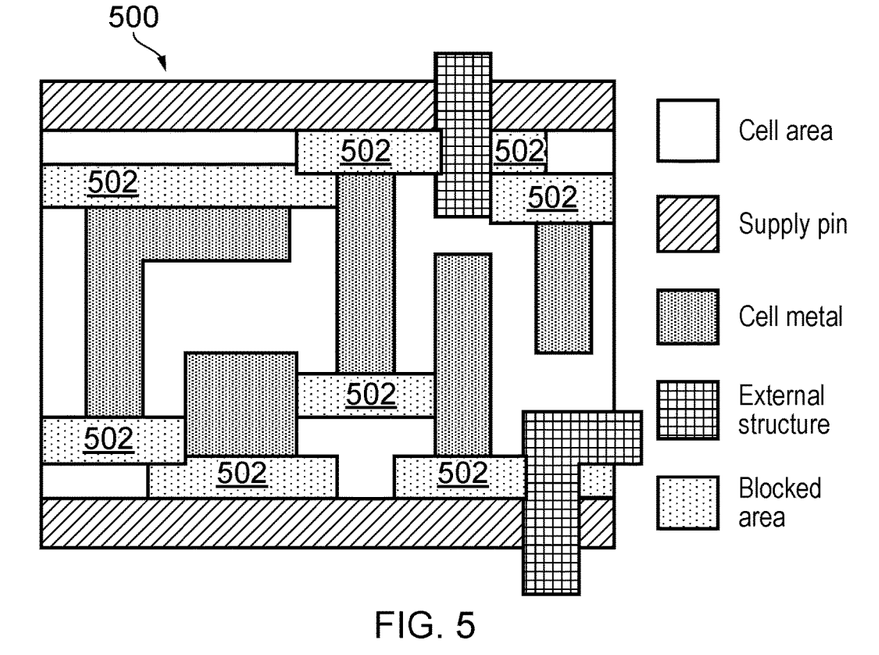
FIG. 5 shows an illustrative embodiment of determining blocked areas.

FIG. 5 shows an illustrative embodiment 500 of determining blocked areas 502. In an embodiment, the blocked areas 502 include areas in which, according to a requirement for a minimum distance between the supply pins 204 and one or more metal structures 206 of the integrated circuit cells, the supply pins 204 cannot be extended. Using this requirement, the blocked areas 502 can easily be determined. Furthermore, in an embodiment, the blocked areas 502 include areas in which, according to a requirement for a minimum distance between the supply pins 204 and one or more metal structures 402 external to the integrated circuit cells, the supply pins 204 cannot be extended. This embodiment further facilitates determining the blocked areas 502. More generally speaking, the blocked areas 502 may include all areas in which, according to design rule constraints (DRCs), the supply pins 204 cannot be extended. This embodiment facilitates optimizing the design, while still allowing supply pin extensions. Thus, the blocked areas 502 may include areas next to the supply pins 204, which for DRC spacing reasons should remain unused. These areas may surround both the cell-internal non-supply structures 206 and the cell-external structures 402 added during the place and route flow.

Figure 6:
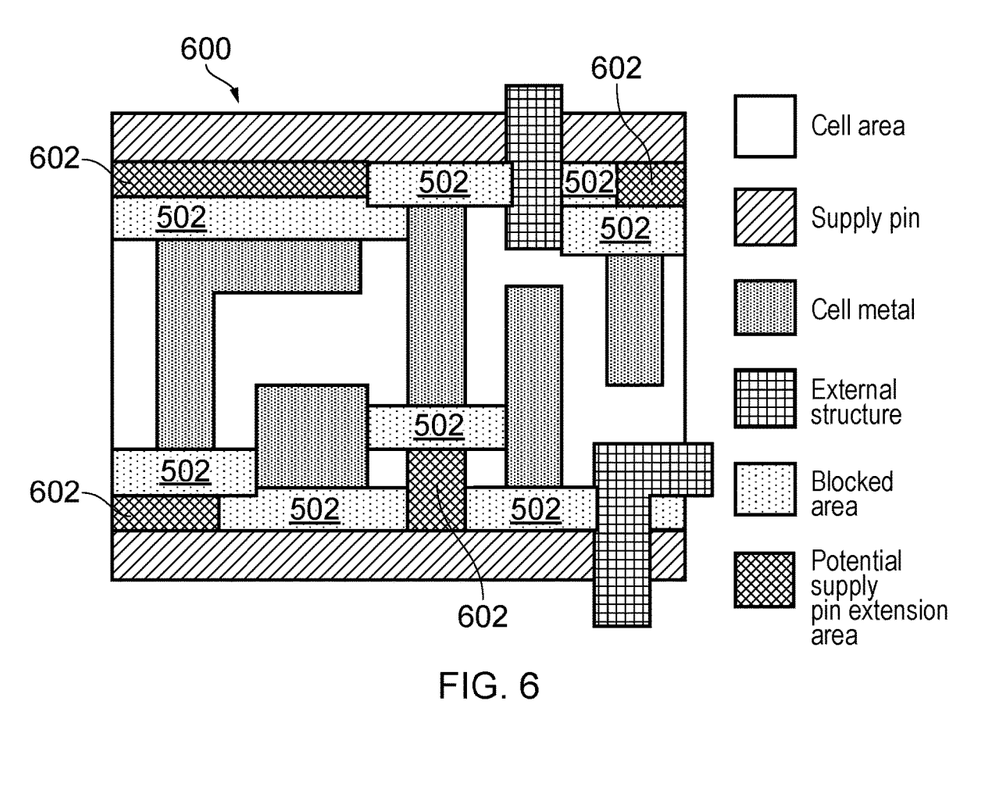
FIG. 6 shows an illustrative embodiment of determining potential supply pin extension areas.

FIG. 6 shows an illustrative embodiment 600 of determining potential supply pin extension areas 602. The potential supply pin extension areas 602 are derived from the blocked areas 502. The supply pins 204 can only be extended outside the blocked areas 502. In other words, the potential supply pin extension areas 602 are the cell areas that are directly adjacent to the supply pins 204, but which do not overlap with the blocked areas 502. FIG. 6 shows that four potential supply pin extension areas 602 have been determined using this approach.

Figure 7:
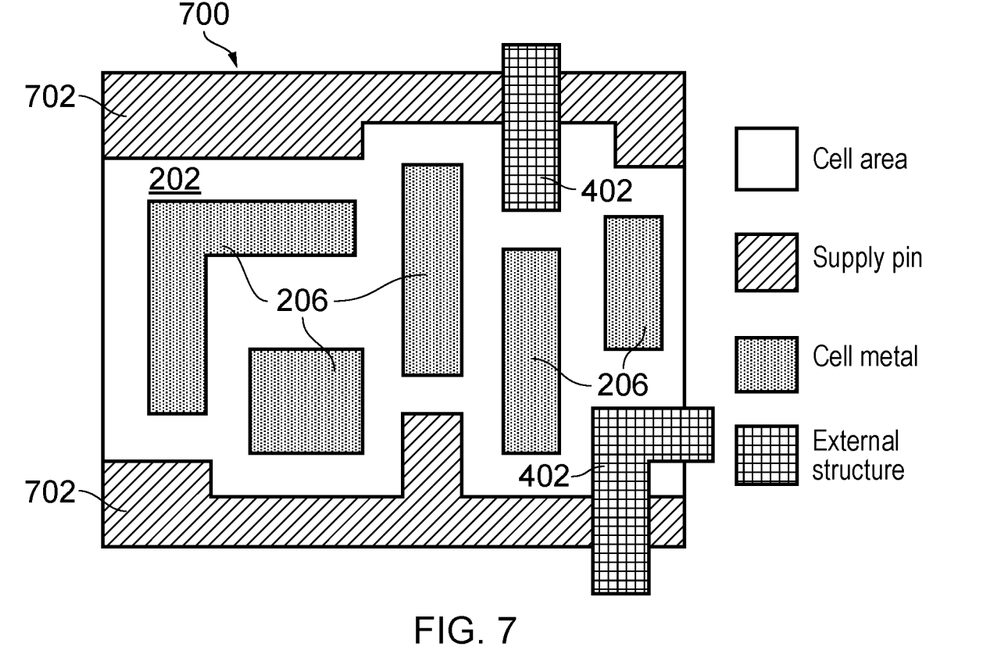
FIG. 7 shows an illustrative embodiment of a semi-custom cell.

FIG. 7 shows an illustrative embodiment of a semi-custom cell 700. In this embodiment, the supply pins 702 have been extended in the potential supply pin extension areas 602 shown in FIG. 6. It is noted that at some locations the supply pins 702 have been extended, while at other locations this was not possible. This reflects the adaptive character of the supply pin extensions. For each cell instance, the supply pins 702 may be extended in a unique way, by taking into account the metal structures of the cells. These metal structures may be internal and external supply-unrelated metal structures. Thus, in an embodiment, the integrated circuit cells comprise different instances of standard cell types.

It is noted that a "cell" or "cell type" is a stand-alone cell or a single element of a cell library and refers to the cell itself, which has a certain function and certain properties.

Cell libraries contain different cells, which implement different functions or the same function with different properties. A cell instance is an instantiation (or a call or a used reference) of a certain cell on a higher level. A block or an IC may use thousands or even millions of instantiations of some cells (such as inverters), while other cells from the given cell libraries may not be used at all, because the function or property is not needed or less beneficial. In accordance with the present disclosure, a cell type may originate from a library and each cell instantiation may undergo a unique supply pin extension depending on the surroundings, which gives more freedom to the setup. In other words, each standard cell type may be instantiated several times, resulting in a plurality of cell instances. In accordance with the present disclosure, each cell instance may have a unique supply pin extension, which has been realized by taking into account the internal and/or external supply-unrelated metal structures of the cell instance. In short, a unique supply pin extension may be realized per cell instance.

Figure 8A:
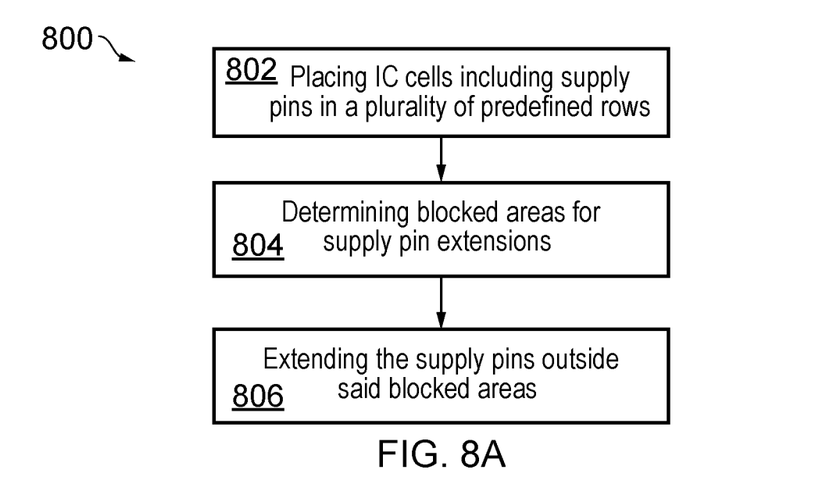
FIG. 8A shows an illustrative embodiment of a method of designing an integrated circuit.

FIG. 8A shows an illustrative embodiment of a method 800 of designing an integrated circuit. The method comprises, at 802, placing integrated circuit cells including supply pins in a plurality of predefined rows. Furthermore, the method 800 comprises, at 804, determining blocked areas for supply pin extensions, and at 806, extending the supply pins outside said blocked areas. In this way, as mentioned above, the overall supply grid resistance can be reduced.

Figure 8B:
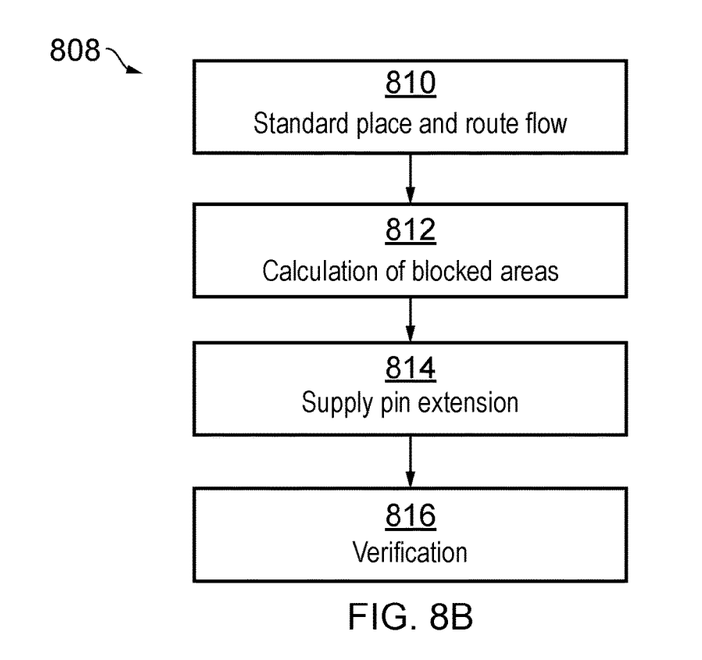
FIG. 8B shows another illustrative embodiment of a method of designing an integrated circuit.

FIG. 8B shows another illustrative embodiment of a method 808 of designing an integrated circuit. The method 808 comprises, at 810, applying a standard place and route flow. Furthermore, the method 808 comprises, at 812, calculating the blocked areas, and at 814, extending the supply pins outside said blocked areas. Finally, the method 808 comprises, at 816, a verification step. Thus, in an embodiment, placing the integrated cells including the supply pins in the plurality of predefined rows is performed using a standard place and route flow 810. Furthermore, in an embodiment, the method 808 comprises verifying 816 the integrated circuit design after extending the supply pins. In this way, the steps of calculating 812 the blocked areas and extending 814 the supply pins are easily integrated into existing IC design methods.

In an embodiment, as shown in FIG. 8B, the steps of calculating 812 the blocked areas and extending 814 the supply pins are performed after the standard place and route flow 810. In this way, the standard flow is not hampered and no obstacles are introduced. The verification step 816 after the steps of calculating 812 the blocked areas and extending 814 the supply pins ensures that the result fulfils all requirements, both design- and process-wise. In an alternative embodiment, the steps of calculating 812 the blocked areas and extending 814 the supply pins are performed before the routing step of the standard place and route flow. In this case, the result of the supply pin extension may be improved, but the above-mentioned cell-external structures cannot be added anymore.

Figure 9:
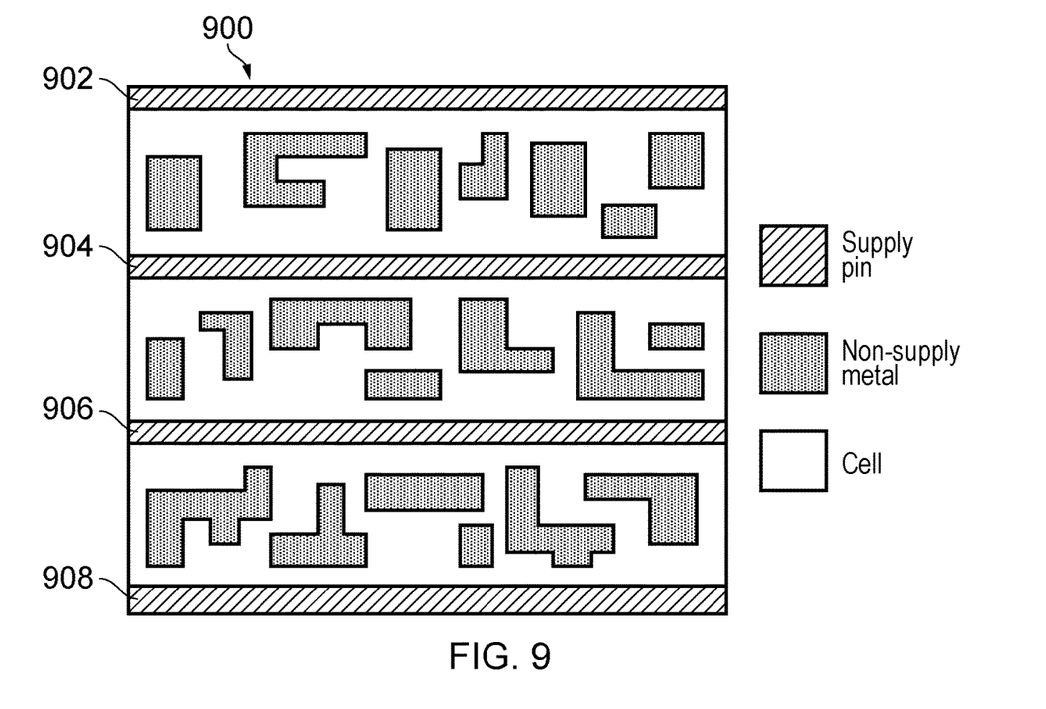
FIG. 9 shows a starting point for a supply pin extension.

FIG. 9 shows a starting point 900 for a supply pin extension. The starting point 900 is a constellation comprising a plurality of cell instances comprising non-supply metal, i.e. supply-unrelated cell-internal metal structures, and a plurality of supply pins 902, 904, 906, 908 adjacent to said cell instances. It is noted that cell-external metal structures are not shown in this example.

Figure 10:
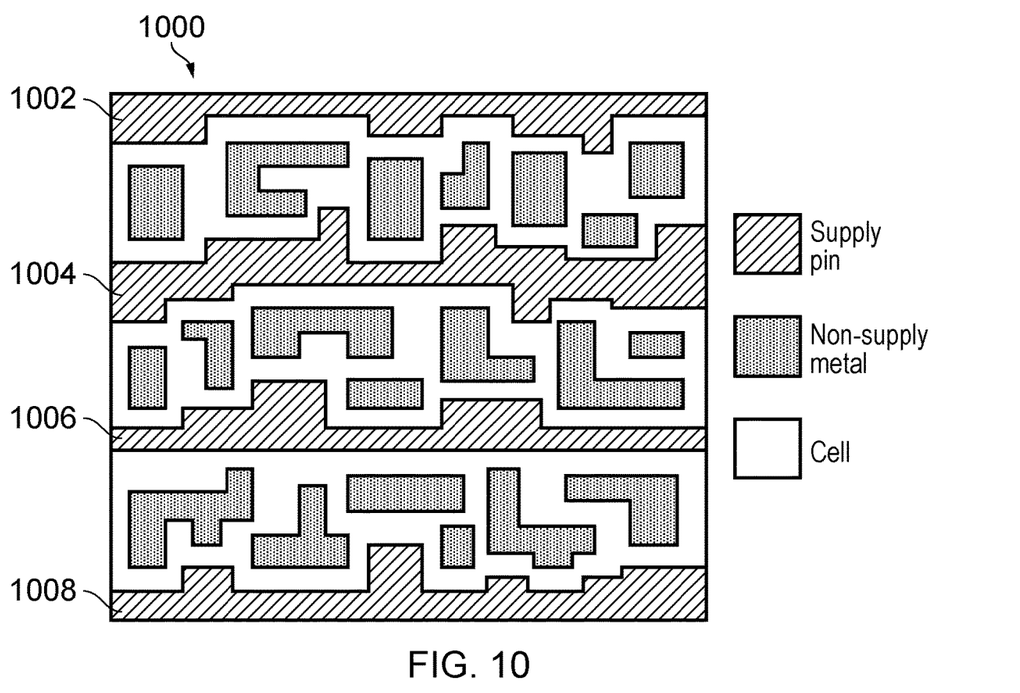
FIG. 10 shows a result of a supply pin extension.

FIG. 10 shows a result 1000 of a supply pin extension in accordance with the present disclosure. The result 1000 is a constellation in which the supply pins 902, 904, 906, 908 have been extended outside the blocked areas. As mentioned earlier, standard cells may be placed in predefined rows, with shared vss and vdd supply structures. This approach strengthens the result of the presently disclosed approach of supply pin extension as the supply pins may be extended to the top and bottom row, as shown in FIGS. 9 and 10. These figures show a starting constellation 900 and a resulting constellation 1000 of several cell rows with different cells. It is noted that the resulting follow pin rows are inhomogeneous. The placement constellation of the neighboring rows may affect the result of the supply pin extension of a cell row depending on the given DRC rules. Therefore, each cell instance is likely to have a supply pin extension which is different from the supply pin extensions of other instantiations of that cell. Due to the extended supply pins 1002, 1004, 1006, 1008 the resistance of the follow pin rows is reduced, which also decreases the resistance of the overall supply topology.

As mentioned above, in certain cases, also additional supplies are needed for the cells, e.g. for level shifting and state retention concepts. In these cases, the cells might have additional supply pins in the middle of the cell area which can form additional supply rows. These cases may in general also be covered by the presently disclosed method. Thus, in an embodiment, the presently disclosed method further comprises placing one or more additional supply pins within at least one of said integrated circuit cells, determining blocked areas for extensions of the additional supply pins, and extending the additional supply pins outside said blocked areas. In this way, the overall supply grid resistance may be further reduced, in particular when additional supply pins are present.

In a practical and effective implementation, two or more of the supply pins are connected to each other to form a follow pin row. Furthermore, in a practical and effective implementation, the supply pins include vss supply pins and vdd supply pins. Furthermore, in an embodiment, extending the supply pins outside the blocked areas comprises extending the supply pins up to a user-defined limit. This increases the flexibility of the presently disclosed method. In an embodiment, a method of fabricating an integrated circuit comprises a design method of the kind set forth. An integrated circuit may be fabricated in accordance with an IC design made by applying the presently disclosed design method. The presently disclosed design method may be regarded as a part of the fabrication method, wherein the steps of the design method precede steps for fabricating the integrated circuit.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 top view of an integrated circuit
102 vdd follow pin row
104 first row of cells
106 vss follow pin row
108 second row of cells
110 vdd follow pin row
112 third row of cells
114 vss follow pin row
116 fourth row of cells
118 vdd follow pin row
200 top view of a standard cell
202 cell area
204 supply pin
206 cell metal
300 top view of a standard cell
302 minimum distance
400 top view of a standard cell
402 external structure
500 embodiment of determining blocked areas
502 blocked area
600 embodiment of determining potential supply pin extension areas
602 potential supply pin extension area
700 embodiment of semi-custom cell
702 supply pin having a variable width
800 method of designing an integrated circuit
802 placing integrated circuit cells including supply pins in a plurality of predefined rows
804 determining blocked areas for supply pin extensions
806 extending the supply pins outside said blocked areas
808 method of designing an integrated circuit
810 standard place and route flow
812 calculation of blocked areas
814 supply pin extension
816 verification
900 starting point for supply pin extension
902 supply pin
904 supply pin
906 supply pin
908 supply pin
1000 result of supply pin extension
1002 extended supply pin
1004 extended supply pin
1006 extended supply pin
1008 extended supply pin

The invention claimed is:

1. A method of designing an integrated circuit, comprising: placing integrated circuit cells of multiple cell types, each cell type includes supply pins in a plurality of predefined rows, wherein the supply pins for a plurality of standard integrated circuit cells of one cell type each has a height and a width, wherein the height is predefined and the width is in a direction of the predefined rows and is greater than the predefined height; adding structures to the integrated circuit design that are external to the integrated circuit cells after the plurality of cells are placed; determining blocked areas for supply pin extensions wherein the blocked areas include areas in which the supply pins cannot be extended in height without violating a design rule constraint; extending the height of the supply pins in the plurality of cells outside said blocked areas and outside areas having the external structures using a standard place and route flow, wherein the extended supply pins of each of the plurality of integrated circuit cells of one cell type have different supply pin heights from each other.

2. The method of claim 1, wherein said blocked areas include areas in which, according to a requirement for a minimum distance between the supply pins and one or more metal structures of the integrated circuit cells, the supply pins cannot be extended in height.

3. The method of claim 1, wherein said blocked areas include areas in which, according to a requirement for a minimum distance between the supply pins and one or more metal structures external to the integrated circuit cells, the supply pins cannot be extended in height.

4. The method of claim 1, wherein placing the integrated circuit cells including the supply pins in the plurality of predefined rows is performed using the standard place and route flow.

5. The method of claim 4, wherein the steps of determining the blocked areas for supply pin extensions and extending the supply pins outside said blocked areas are performed after the standard place and route flow.

6. The method of claim 4, wherein the steps of determining the blocked areas for supply pin extensions and extending the supply pins outside said blocked areas are performed before the routing step of the standard place and route flow.

7. The method of claim 1, further comprising verifying the integrated circuit design after extending the supply pins.

8. The method of claim 1, wherein the integrated circuit cells include one or more additional supply pins; and wherein the method further comprises determining blocked areas for extensions of the additional supply pins, and extending the additional supply pins outside said blocked areas.

9. The method of claim 1, wherein two or more of said supply pins are connected to each other to form a follow pin row.

10. The method of claim 1, wherein the supply pins include vss and vdd supply pins.

11. The method of claim 1, wherein extending the supply pins outside said blocked areas comprises extending the supply pins up to a user-defined limit.

12. A method of fabricating an integrated circuit, comprising the method of claim 1.

13. An integrated circuit fabricated using the method of claim 12.

* * * * *